United States Patent
Simonson

(10) Patent No.: US 7,115,199 B2
(45) Date of Patent: Oct. 3, 2006

(54) FILTER HOUSING WITH INTERCHANGEABLE FILTER MOUNTING PLATE

(76) Inventor: Eric H. Simonson, 4666 Briar Hill Rd., Cortland, NY (US) 13045

(*) Notice: Subject to any disclaimer, the term of this patent is extended or adjusted under 35 U.S.C. 154(b) by 11 days.

(21) Appl. No.: 10/903,997

(22) Filed: Jul. 30, 2004

(65) Prior Publication Data

US 2005/0006298 A1 Jan. 13, 2005

Related U.S. Application Data

(62) Division of application No. 10/081,315, filed on Feb. 21, 2002, now abandoned.

(51) Int. Cl.
B01D 29/50 (2006.01)

(52) U.S. Cl. .............. 210/232; 210/239; 210/323.2; 210/440

(58) Field of Classification Search .......... 210/239, 210/240, 316, 317, 323.1, 323.2, 438, 440, 210/450–452, 456, 462, 232, 335, 339, 541; 55/341.2
See application file for complete search history.

(56) References Cited

U.S. PATENT DOCUMENTS

| | | | |
|---|---|---|---|
| 4,187,179 A * | 2/1980 | Harms | 210/238 |
| 4,247,394 A * | 1/1981 | Schmidt, Jr. | 210/767 |
| 4,609,462 A * | 9/1986 | Flynn | 210/232 |
| 5,556,522 A | 9/1996 | Ingalls | |
| 6,221,246 B1 | 4/2001 | Shums | |
| 6,251,269 B1 | 6/2001 | Johnson | |

* cited by examiner

Primary Examiner—Matthew O. Savage
(74) Attorney, Agent, or Firm—Hedman & Costigan, P.C.

(57) ABSTRACT

A fluid treatment housing system for fluid filter elements including a first housing member, a second housing member and an interchangeable mounting plate on which one or more filter elements are mounted. The mounting plate may be a substantially flat plate or a basket type structure to accommodate various inside-out and outside-in filter elements. Additionally, more than one mounting plate may be used in a single system so that the system can include both pre and post fluid treatment.

20 Claims, 15 Drawing Sheets

FILTER ASSEMBLY
INSIDE-OUT ELEMENT FLOW

FILTER ASSEMBLY
INSIDE-OUT ELEMENT FLOW

FILTER ASSEMBLY
OUTSIDE-IN ELEMENT FLOW

PRE FILTER & AFTER FILTER
OUTSIDE-IN UPSTREAM ELEMENT FLOW
OUTSIDE-IN DOWNSTREAM ELEMENT FLOW

PRE FILTER & AFTER FILTER
INSIDE-OUT UPSTREAM ELEMENT FLOW
INSIDE-OUT DOWNSTREAM ELEMENT FLOW

PRE FILTER & AFTER FILTER
INSIDE-OUT UPSTREAM ELEMENT FLOW
INSIDE-OUT DOWNSTREAM ELEMENT FLOW

INSIDE-OUT ELEMENT FLOW MOUNTING PLATE

OUTSIDE-IN ELEMENT FLOW MOUNTING PLATE

INSIDE-OUT ELEMENT FLOW PREFILTER MOUNTING PLATE

OUTSIDE-IN ELEMENT FLOW ADAPTER

OUTSIDE-IN ELEMENT FLOW AFTER FILTER ADAPTER

CONDUIT SEAL RETAINER

INLET FLOW EXTENSION CONDUIT

INLET FLOW EXTENSION CONDUIT

FILTER ELEMENT
INSIDE-OUT FLOW

FILTER ELEMENT
OUTSIDE-IN FLOW

FILTER HOUSING WITH INTERCHANGEABLE FILTER MOUNTING PLATE

This application is a divisional application of Ser. No. 10/081,315, filed Feb. 21, 2002, now abandoned.

BACKGROUND OF THE INVENTION

1. Field of the Invention

The present invention relates generally to a fluid treatment apparatus having interchangeable fluid treatment elements. More specifically, it relates to a filter housing that can be adapted to accommodate different filter elements within a housing unit, including accommodating both inside-out and outside-in flow filters in a single housing.

2. Description of the Related Art

Filters for removing impurities from fluid are well known and are used in many applications. For example, fluid treatment arrangements may be used to remove particulate matter from oil or water. Typically, filter elements are utilized with a particular size, capacity and fixed number within a fluid treatment arrangement.

However, the prior art presents an inherent inflexibility on the part of the filtering system to adapt to different conditions. This may render the treatment system incapable of use for different applications. Also, many fluid treatment arrangements include multiple treatment elements. In many such applications where the number of treatment elements may be quite large the housing is very expensive, especially when fabricated from alloy materials.

Existing filter housings are incapable of adapting to changes in service conditions that may necessitate a change in the direction of fluid to be treated, or the like. Compounding this problem is an inability on the part of present housings to accommodate treatment elements with different flow characteristics from a variety of element manufacturers.

SUMMARY OF TH INVENTION

It is therefore an object of the present invention to provide a fluid treatment housing system capable of accommodating a plurality of fluid treatment elements of various dimensions with an inherent ability for the user to accommodate both pre and post treatment of fluids. These can include pre and post filter elements or fluid treatment materials such as charcoal or exchange resin materials and the like.

This and other objectives are achieved by the present invention, directed to a fluid filtration housing system comprising a first housing member, a second housing member and at least one interchangeable filter element mounting plate, said mounting plate comprising one or more apertures each having element mounts for releasably receiving a filter element. The element mounting plate can be changed to a different mounting plate to accommodate different treatment elements with different flow characteristics, commercially available from a variety of element manufacturers.

The interchangeable filter element mounting plate preferably has a mounting flange for securing the mounting plate within the housing members. In its most preferred embodiment, the mounting flange is secured between closure flanges on the housing members in a sealed relationship.

The fluid treatment housing system provides that fluid can be filtered in one direction, whereby the particulate matter is collected on the inside surface of the filter elements and, if desired, the housing system can be easily adapted to filter fluid in the other direction, to collect particulate matter on the outside of filter elements when the fluid direction across the filter is reversed.

The filter housing of the present invention can be further modified to pre-treat fluid by using a second housing member having an extended height for accommodating an additional set of filter elements. Correspondingly, when reverse flow of fluid is desired, a second or post treatment of the fluid traveling in the opposite direction can be obtained within the extended second housing member.

BRIEF DESCRIPTION OF DRAWINGS

The following drawings, in which like reference characters indicate like parts, are included for illustration of the present invention without limiting the invention in any manner whatsoever, wherein:

FIG. 9D is a cross-sectional view of a basket type element mounting plate for inside-out flow in a widened first housing member.

DETAILED DESCRIPTION OF THE PREFERRED EMBODIMENT

Figure 1:
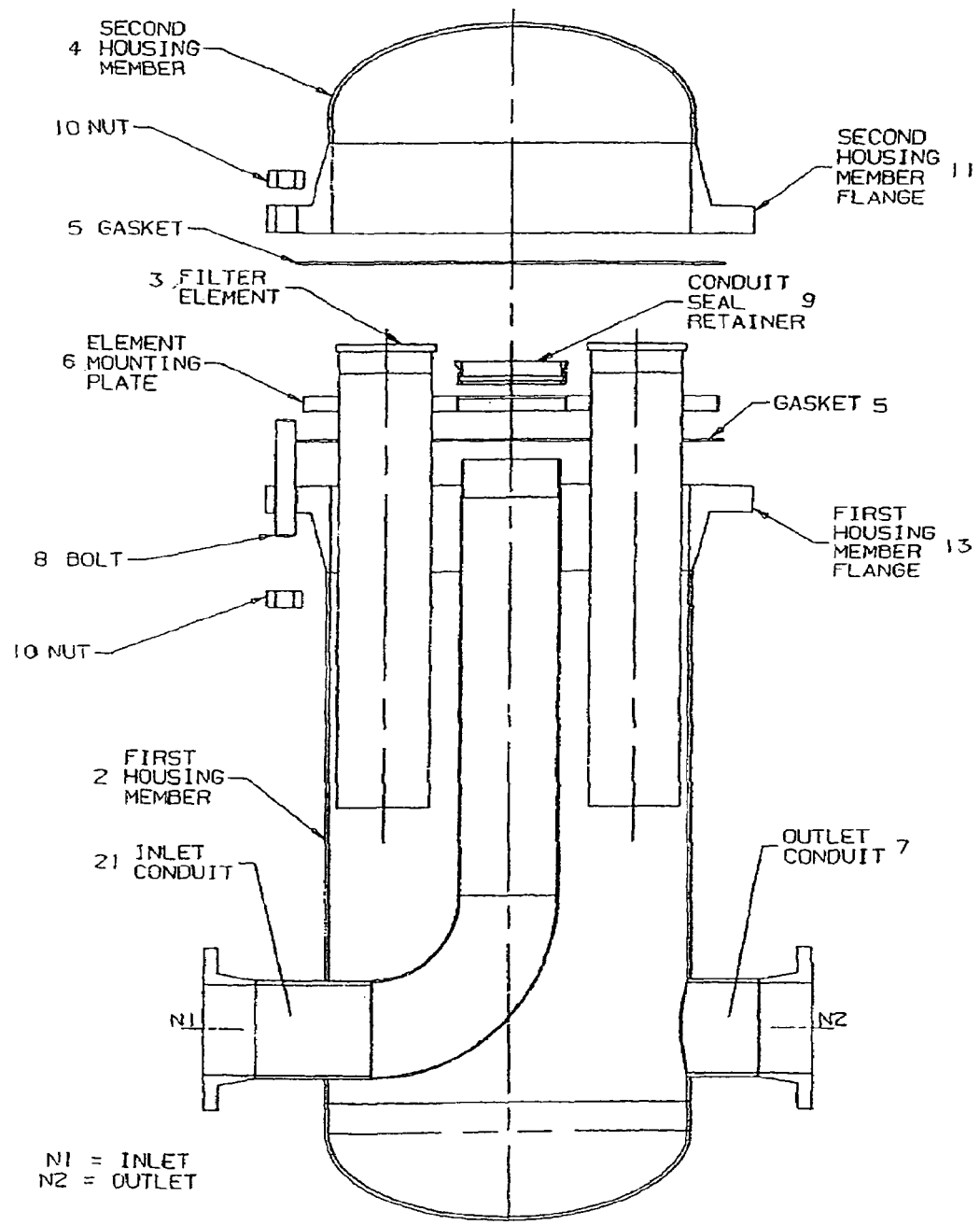
FIG. 1 is a medial cross-sectional view of a filter housing system in accordance with the present invention, containing an inflow and outflow conduit within the first housing member illustrating inside-out filter elements suspended from the element mounting plate within the first housing member. The filter housing system is fitted with inside-out flow filter elements and a housing bonnet.

In the preferred embodiment, shown in the drawings attached hereto, the present invention comprises a first housing member 2, a second housing member 4 and a replaceable element mounting plate 6. Filters 3 for removing particulate debris from a fluid flow are placed on the mounting plate 6 within the housing members 2 and 4, wherein one or more of the housing members 2 and 4 include conduits 21 and 7 to receive fluid flow.

In a preferred embodiment, shown in FIG. 1, the first and second housing members 2 and 4 are separated by a sealed, substantially flat element mounting plate 6 having filter elements 3 mounted thereon. The filter elements 3 are positioned on the mounting plate 6 within the filter housing 2 to receive and remove particulate material from fluid flow between the conduits 21 and 7. The mounting plate 6 and filter elements 3 make up a sealed environment between the first and second housing members 2 and 4 to ensure filtration of the fluid.

Figure 8A:
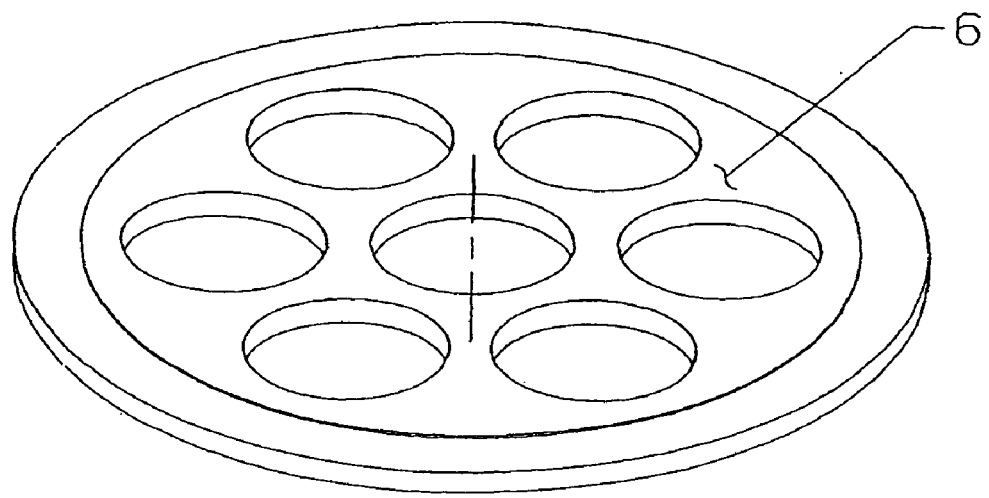
FIG. 8A is a perspective view of a mounting plate for use in the present housing system with a plurality of apertures for inside-out flow elements.
Figure 12:
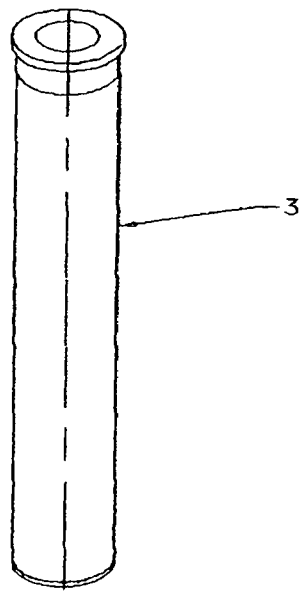
FIG. 12 is a common inside-out flow filter element known in the art.

In the embodiment shown in FIG. 1, fluid flows into the first housing member 2 through inlet conduit 21, into the interior of the second housing member 4 and down through the interior of filter elements 3, where debris are captured within the filter elements 3. Filter element 3 (as shown in FIG. 12) illustrates an inside-out flow filter element known in the art. In the preferred embodiment the open end of the filter is secured to the aperture of mounting plate 6 (as shown in FIG. 8A) within the filter housing.

Any known method for securing the filters to the mounting plate may be used such as pressure fittings, tie rods or suitable threading. However, once the filter element 3 is secured to the mounting plate 6 by the desired method, a sealed relationship is formed between the first and second housing members 2 and 4.

Fluid flow then exits the interior of the filter elements 3 into the interior of first housing member 2 and proceeds through outlet conduit 7, where it is discharged from the first housing member 2.

Figure 10:
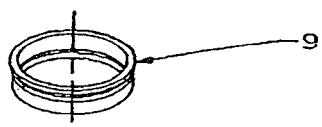
FIG. 10 is a conduit seal retainer.

The sections corresponding to the interior of the first housing member 2 and the second housing member 4 are sealed from one another by a flat mounting plate 6 and filter elements 3 which are mounted thereon. In this regard, the mounting plate 6 forms a sealed environment through the use of gaskets 5 between the mounting plate 6 and housing members 2 and 4 and a conduit seal retainer 9 (as shown in FIG. 10) to seal the conduit 21 as it passes through the mounting plate 6, and into communication with the second housing member 4.

Once the filters 3 are installed on the mounting plate 6 in sealed relation therewith, the first 2 and second 4 housing members are fixed together. Although any known method for attaching the housing members 2 and 4 may be used, a method which has been found to be suitable includes cooperating first and second housing flanges 13 and 11, through which one or more bolts 8 are inserted and secured with cooperating nuts 10 to maintain the sealed relationship of the housing.

Figure 2:
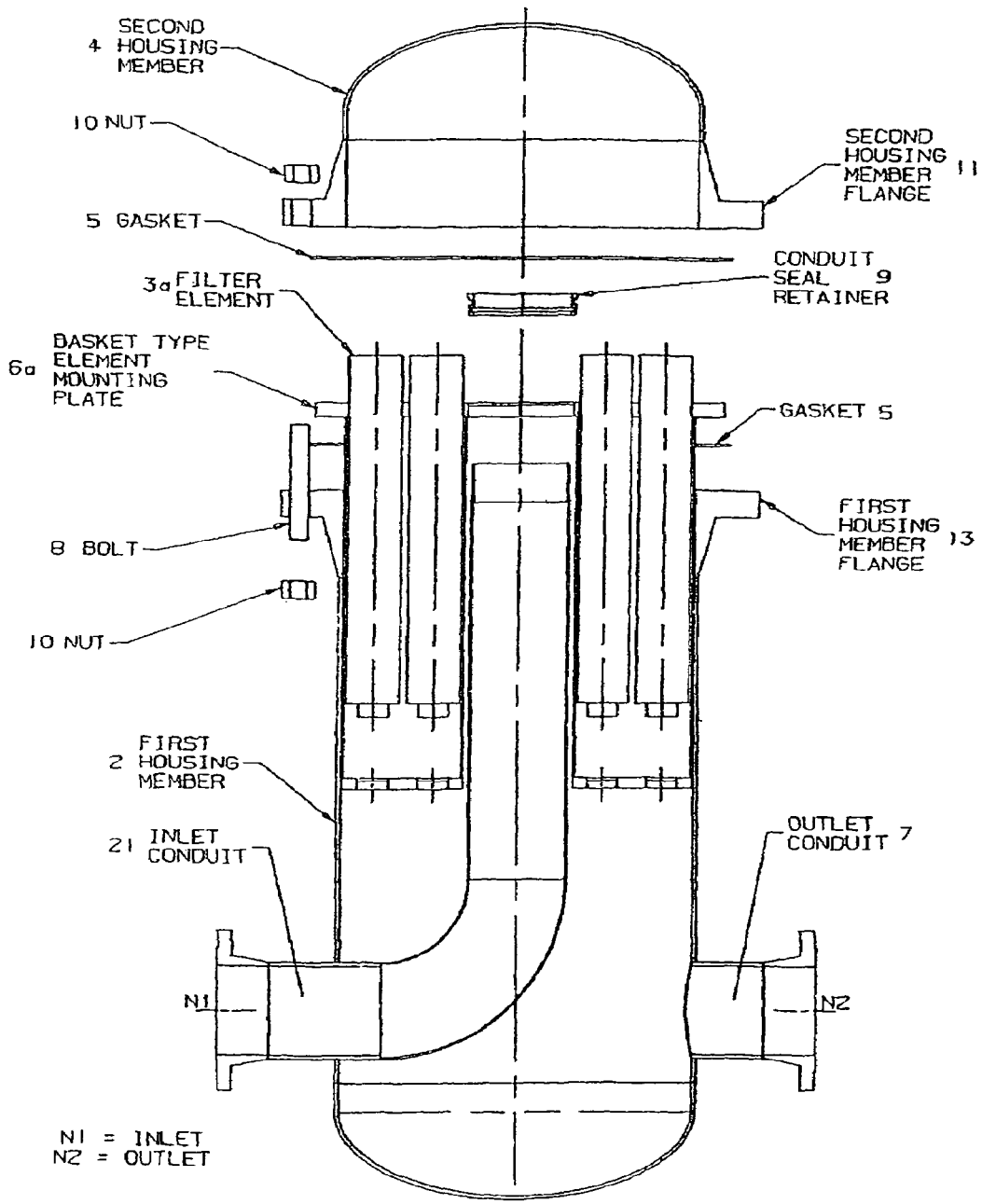
FIG. 2 is a medial cross-sectional view of the filter housing system showing the element mounting plate replaced with a basket shaped outside-in filter element flow mounting plate, fitted with outside-in flow filter elements.
Figure 9A:
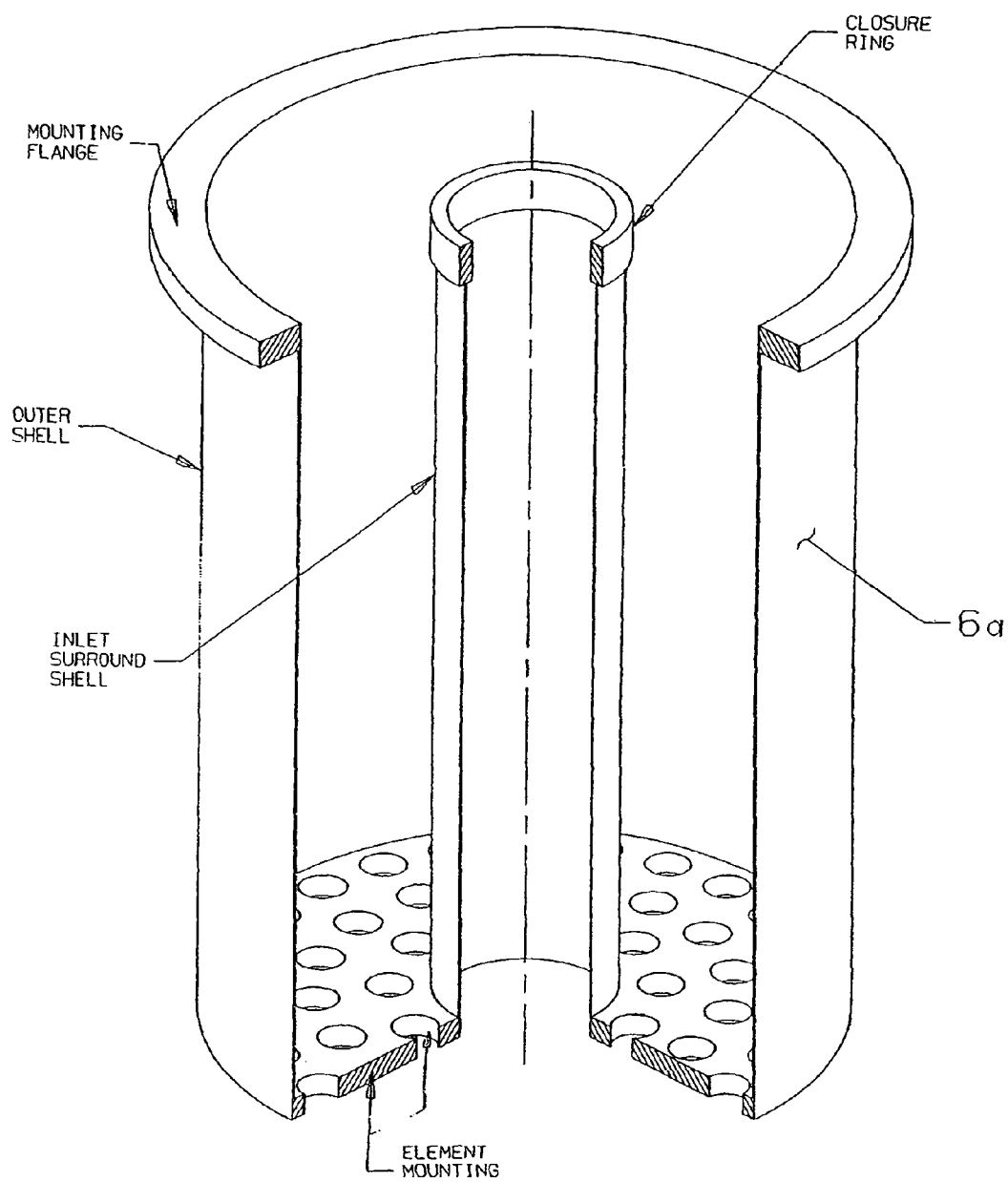
FIG. 9A is a cross-sectional view of a basket type element mounting plate for outside-in filter flow in the first housing member.
Figure 13:
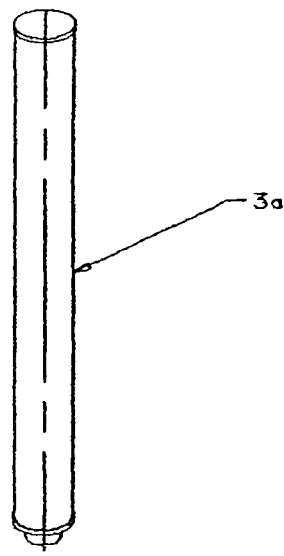
FIG. 13 is a common outside-in flow filter element known in the art.

In the preferred embodiment shown in FIG. 2, the mounting plate 6a is a basket type (as shown in FIG. 9a) for retaining alternative filter elements 3a (as shown in FIG. 13) which utilize an outside-in fluid flow, as previously known in the art. The Basket type mounting plate 6a extends down into first housing member 2 and, when filter elements 3a are attached to the mounting plate 6a, a sealed environment between the interiors of the housing members 2 and 4 is created.

Here, fluid flows into the first housing member 2 through conduit 21, into the interior of the second housing member 4 and about the exterior of the filter elements 3a. In the preferred embodiment, filter elements 3a illustrate an outside-in filter, as known in the art, capable of filtering fluid as fluid flows from the exterior to the interior of the filter elements. As particulate matter is collected on the exterior of filters 3a, filtered fluid enters the interior of the first housing member 2 and exits the first housing member 2 through the conduit 7.

Figure 3:
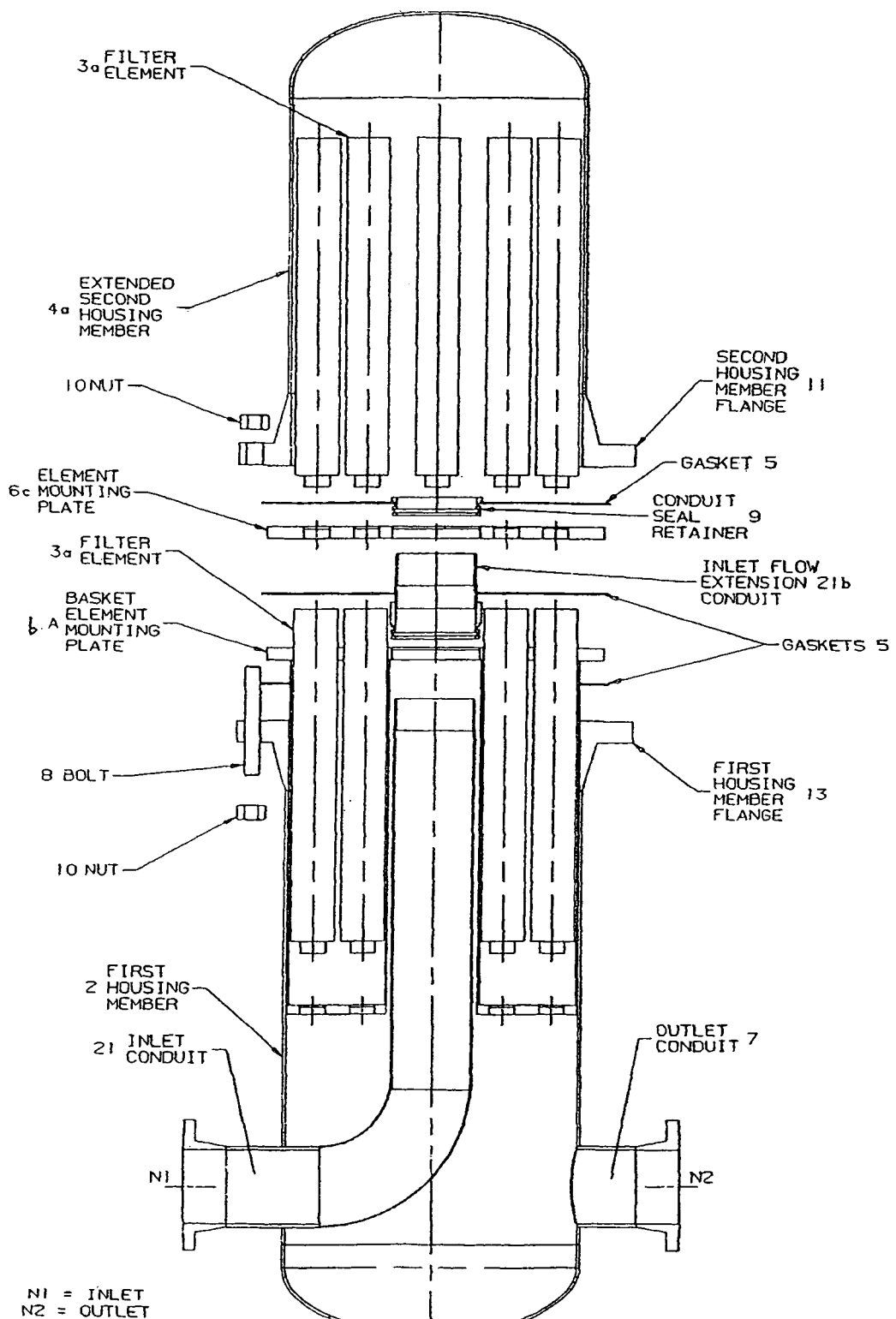
FIG. 3 is a medial cross-sectional view of the filter housing system showing the housing fitted with an extended height bonnet and an element mounting plate containing pre-treatment outside-in filter elements. Also, within the extended height bonnet an inlet flow extension conduit and a seal ring installed above the element mounting plate. An after treatment utilizing outside-in flow filter elements in the first housing member.
Figure 8B:
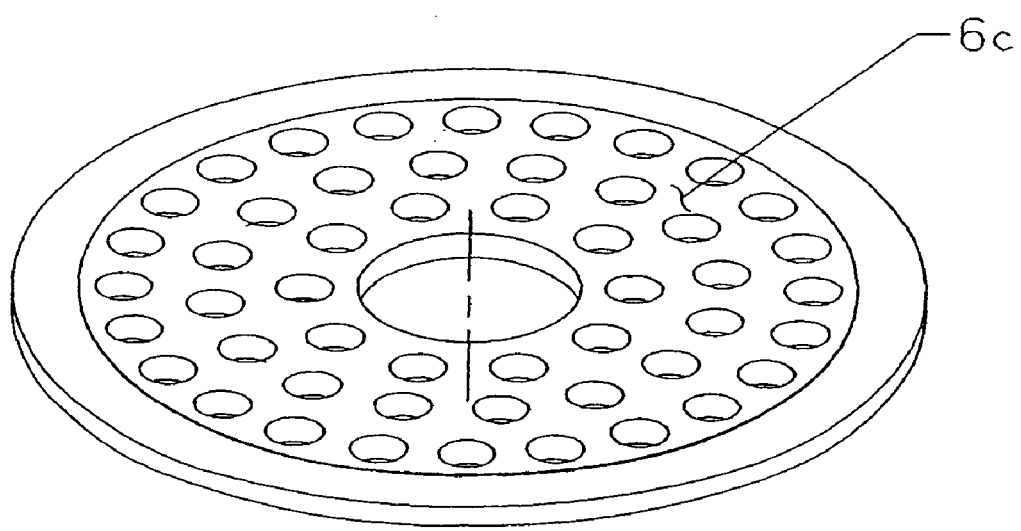
FIG. 8B is a perspective view of a mounting plate for use in the present housing system with a plurality of apertures for outside-in flow elements.
Figure 11A:
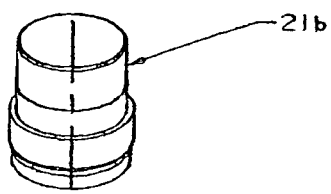
FIG. 11A is a perspective view of short extension conduit.

The embodiment shown in FIG. 3 provides for a first housing member 2 and an extended second housing member 4a with inlet conduit extension 21b (as shown in FIG. 11A), as well as inlet conduit 21 and outlet conduit 7 in the first housing member 2 to receive and discharge fluid flow. Filter elements 3a are located within the second housing member 4a on a first substantially flat mounting plate 6c (as shown in FIG. 8B) for pretreating the fluid. A second set of filters 3a are mounted on a basket type mounting plate 6a within housing member 2 for an after treatment, providing two filtering treatments in a single pass.

In the preferred embodiment of FIG. 3, housing members 4a and 2 are separated by a flat mounting plate 6c and a basket mounting plate 6a having the appropriate gaskets 5 and conduit seal retainer 9 to seal the interior environments of the housing members 2 and 4a. A set of pretreatment filter elements 3a are attached to the mounting plate 6c within the extended second housing member 4a and an after treatment set of filter elements 3a are attached to basket type mounting plate 6a within the first housing member 2.

As fluid flow from conduit 21 enters the interior of the second housing member 4a, particulate material is removed by filters 3a in housing member 4a by passing from the exterior of the filters 3a to the interior of the filters 3a. The pretreated fluids then pass down into the interior of the first housing member 2, flowing from the exterior of the filters 3a to the interior of the filters 3a and into housing member 2. The twice filtered fluids exit the first filter housing 2 via outlet conduit 7.

Figure 4:
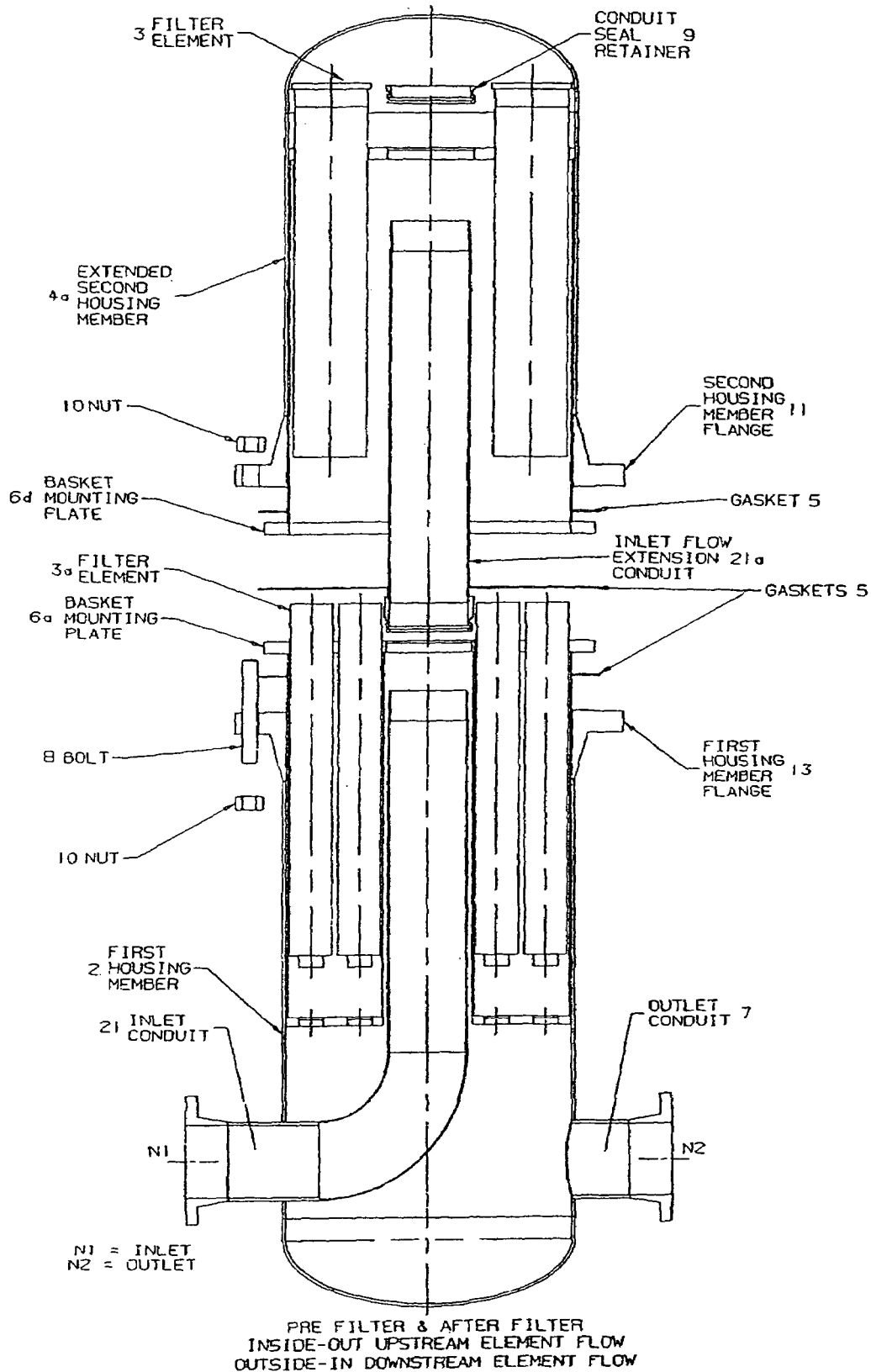
FIG. 4 is a medial cross-sectional view of the filter housing system showing the extended height bonnet second housing member with an inlet flow extension conduit and pre-treatment basket shaped element mounting plate with inside-out filter elements and an after treatment using a basket shaped outside-in filter element flow mounting plate with outside-in flow filter elements in the first housing member.
Figure 11B:
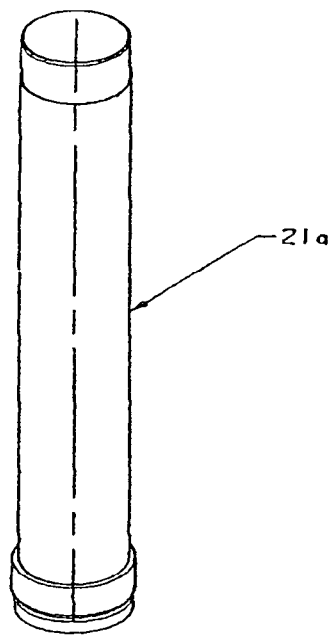
FIG. 11B is a perspective view of long extension conduit.

Similarly, the preferred embodiment shown in FIG. 4 provides for a first housing member 2, and an extended housing member 4a, wherein the first housing member 2 includes an inlet conduit 21, an inlet conduit extension 21a (as shown in FIG. 11B) and an outlet conduit 7 for exit of the fluid. The first and second housing members 2 and 4a are separated by sealed basket mounting plates 6a and 6d each having a set of filter 3a and 3 respectively mounted thereon.

Figure 9B:
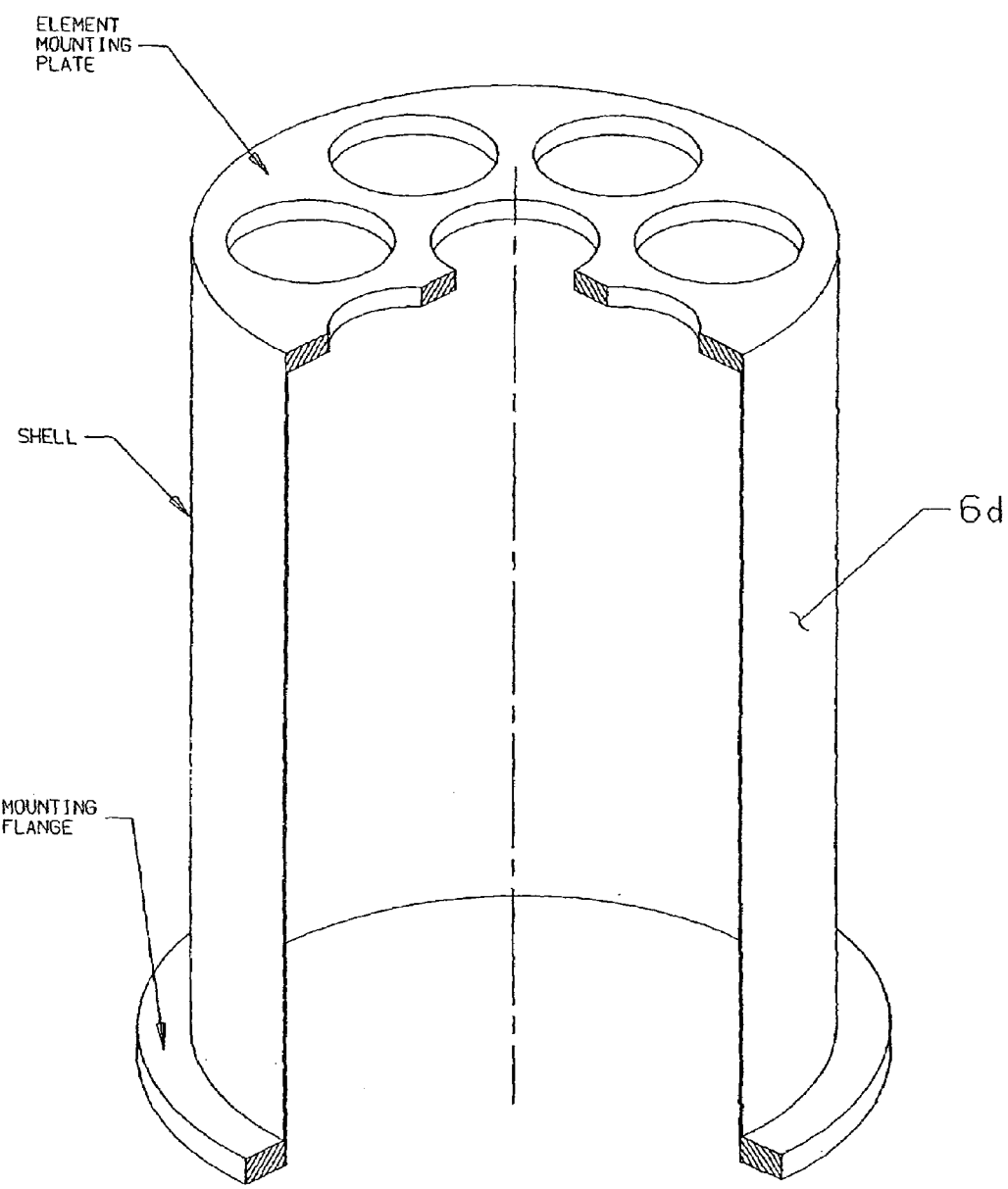
FIG. 9B is a cross-sectional view of a basket type element mounting plate for inside-out flow in the second housing member.

In this embodiment, pretreatment inside-out filters 3 are mounted on basket type mounting plate 6d (as shown in FIG. 9B), located in the second housing member 4a. Post treatment outside-in filters 3a are attached to element mounting plate 6a hanging into the first housing member 2.

The preferred embodiment shown in FIG. 4, provides for pre and post fluid filter treatment wherein fluid flow is directed through inlet conduit 21 into inlet conduit extension 21a and up to the interior of housing member 4a at the top end, above the top of the filters 3. The fluid is filtered from the interior to the exterior of the filter elements 3 and down to the exterior of the filter elements 3a in the first housing member 2. The fluid filters into the interior of the filters 3a, collecting in the interior of the first housing member 2 and exiting through outlet conduit 7. As such, the configuration of FIG. 4 provides for inside-out pretreatment upstream in the interior of the second housing member 4a and outside-in post treatment downstream in the interior of the first housing member 2.

Figure 5:
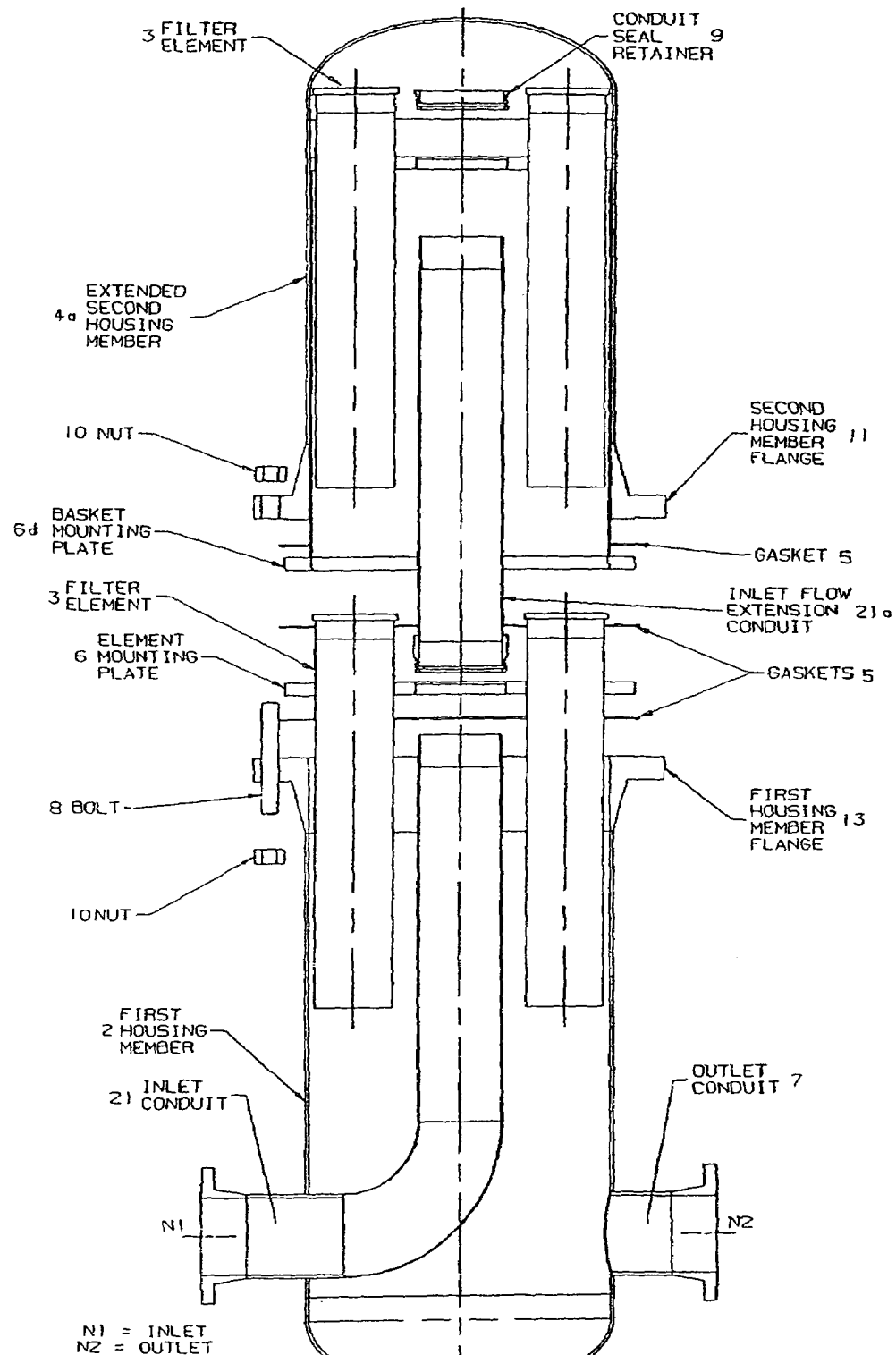
FIG. 5 is a medial cross-sectional view of the filter housing system showing the housing with pre-filter and after-filter flow modifications, both first and second member housing elements containing inside-out fluid filter elements.

In the embodiment shown in FIG. 5, fluid flows into inlet conduit 21 of the first housing member 2, through the inlet conduit extension 21a and into the interior of the second housing member 4a above the filters 3. The fluid is filtered by passing from the interior to the exterior of filter elements 3 mounted on basket type filter element mounting plate 6d (as shown in FIG. 9B), which extends into the second housing member 4a. The filtered fluid then flows from the exterior of the upper pretreatment filters 3 to the interior of the post treatment filter elements 3 in the first housing member 2, mounted on mounting plate 6. The twice filtered fluid collects in the interior of the first housing member 2 and exits the first housing member 2 through outlet conduit 7.

The housing members 2 and 4a in the preferred embodiment of FIG. 5 are separated by sealed element mounting plates 6 and basket element mounting plate 6d, having gaskets 5 between the housing members 2 and 4a and mounting plates 6 and 6d, respectively, as well as between the mounting plates 6 and 6d themselves.

Figure 6:
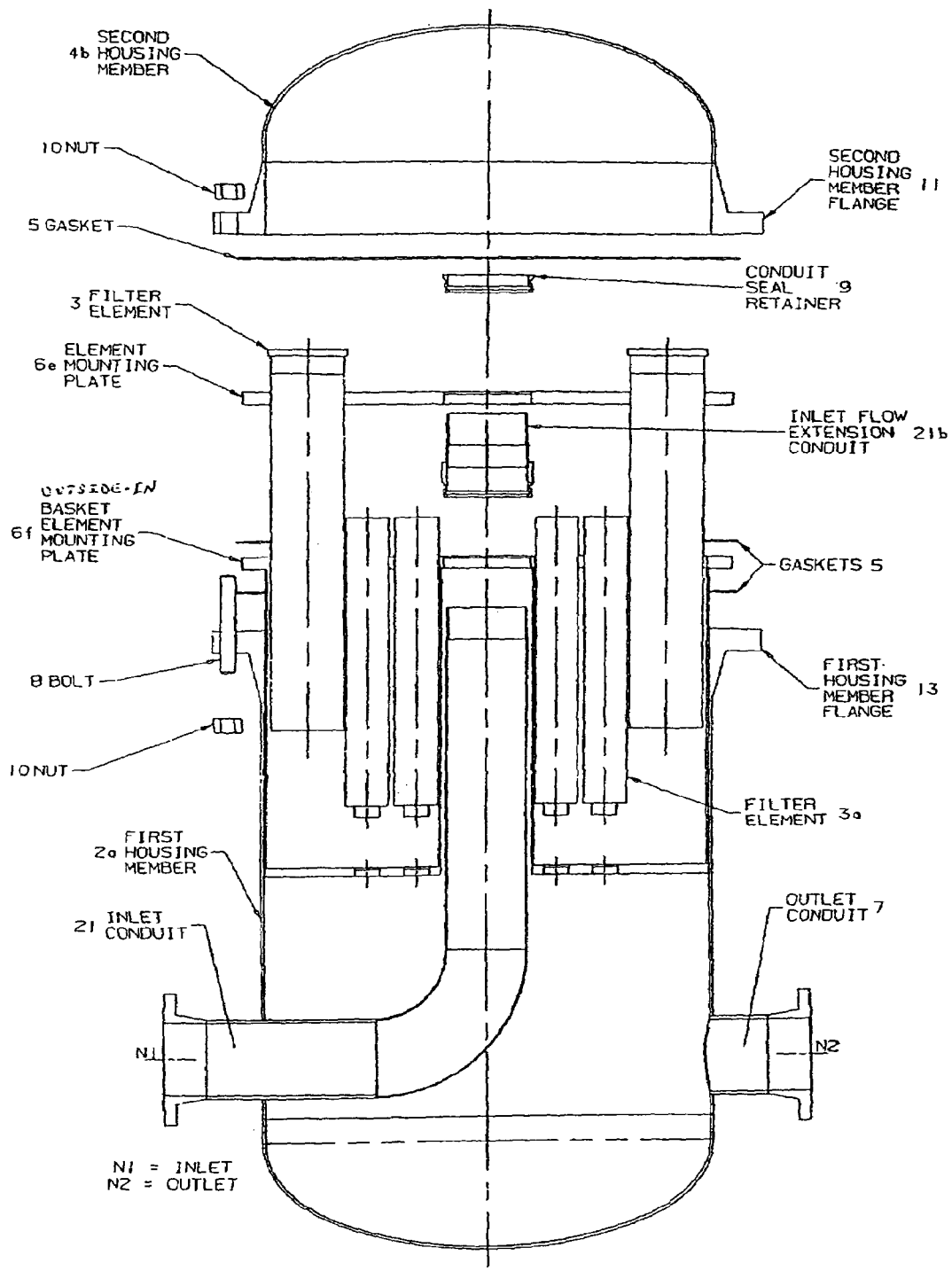
FIG. 6 is a medial cross-sectional view of a widened first housing member containing an inflow and out flow conduit, fitted with both inside-out and outside-in flow filter elements and a housing bonnet. The filter housing accommodates both pre-treatment inside-out flow and after-treatment outside-in within the first filter housing member.

The preferred embodiment of FIG. 6 depicts a twice filtered fluid flow, having a first pretreatment fluid filtration using inside-out filter elements 3 and a second filtration utilizing outside-in filter flow elements 3a, the entire filtration occurring within a widened first housing member 2a. Fluid flow is directed through inlet conduit 21 and conduit extension 21b of the first housing member 2a, into the interior of widened second housing member 4b, and passes to the interior of inside-out filter flow elements 3. The pretreated fluid exits filters 3 and enters the interior of outside-in filter flow elements 3a all within the first housing member 2a.

Figure 8C:
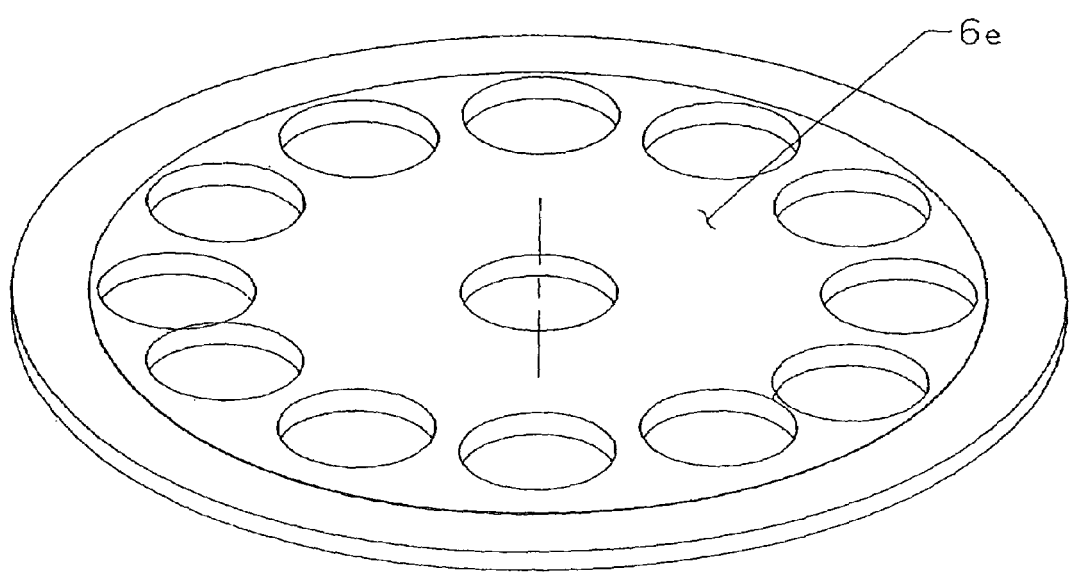
FIG. 8C is a perspective view of a widened mounting plate for use in the present housing system with apertures for inside-out pretreatment elements.
Figure 9C:
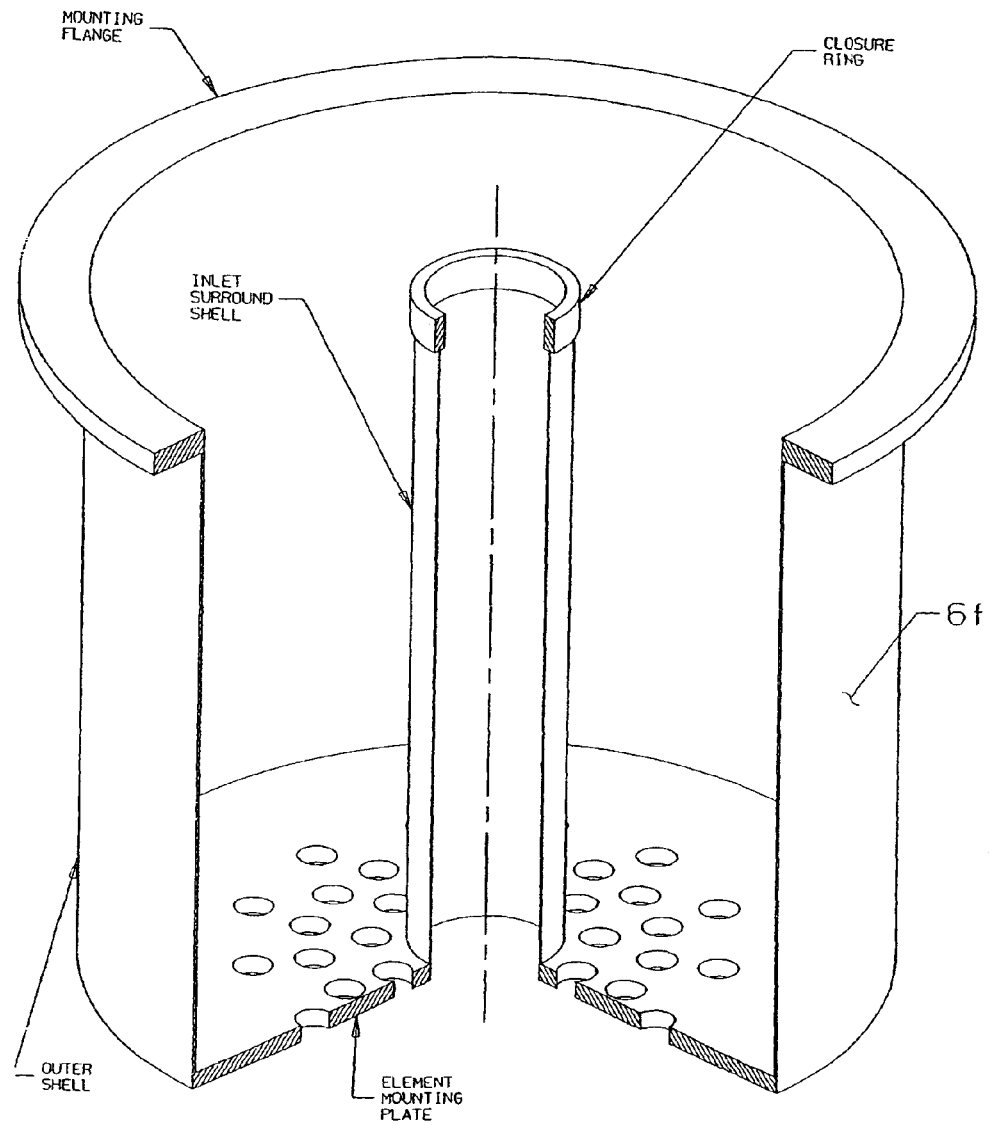
FIG. 9C is a cross-sectional view of a basket type element mounting plate for outside-in flow in a widened first housing member.
Figure 90:
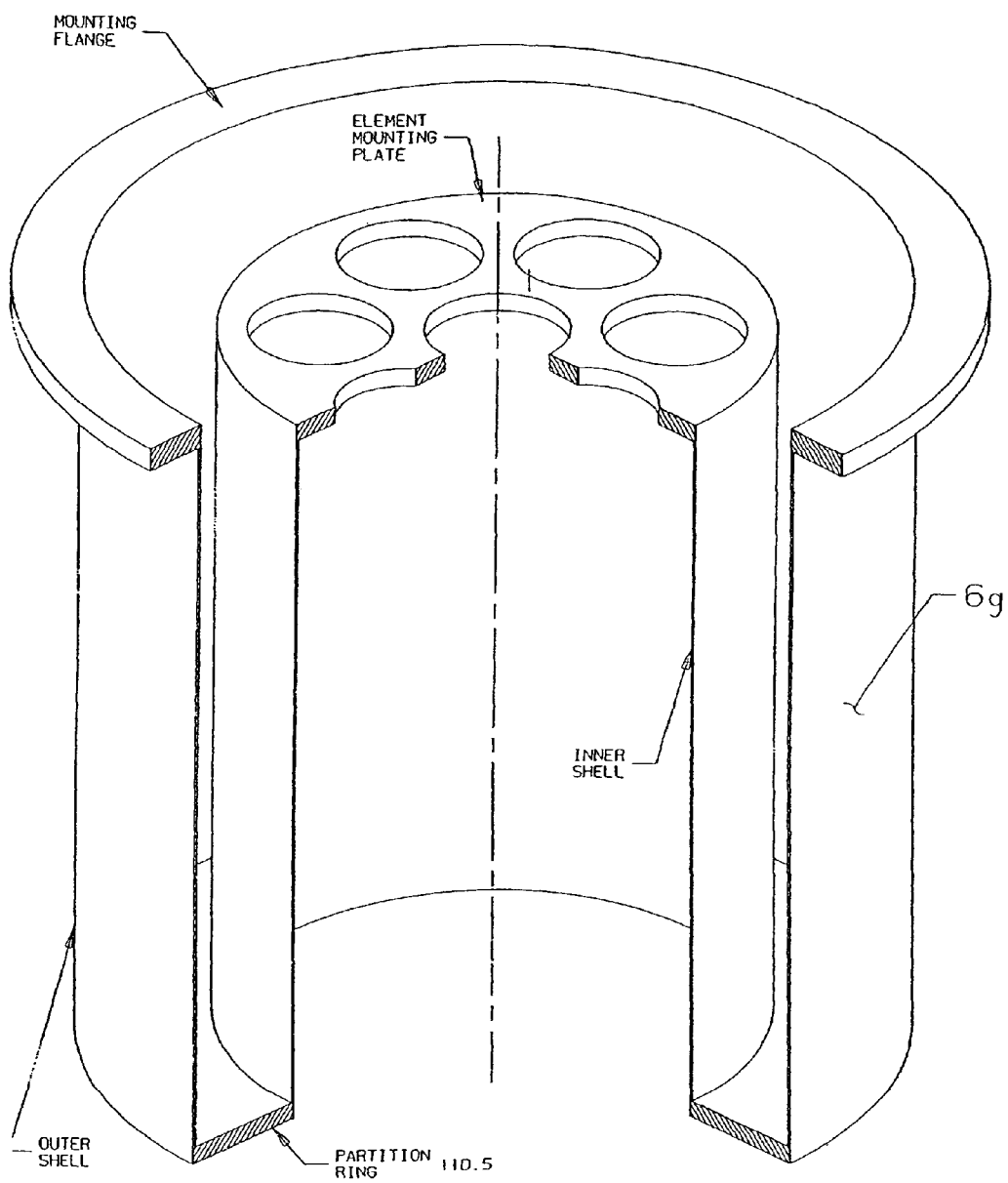

In the preferred embodiment of FIG. 6, housing members 4b and 2a are separated by a widened flat mounting plate 6e (as shown in FIG. 8C) and a widened basket mounting plate 6f (as shown in FIG. 9C) having the appropriate gaskets 5 and conduit seal retainer 9 to seal the interior environments of the housing members 2a and 4b. A set of pretreatment filter elements 3 are attached to the mounting plate 6e within the widened first housing member 2a and a after treatment set of filter elements 3a are attached to basket type mounting plate 6f within the widened first housing member 2a.

The housing members 2a and 4b in the preferred embodiment of FIG. 6 are separated by sealed element mounting plates 6e and basket element mounting plate 6f, having gaskets 5 between the housing members 2a and 4b and mounting plates 6e and 6f, as well as between the mounting plates 6e and 6f themselves.

Figure 7:
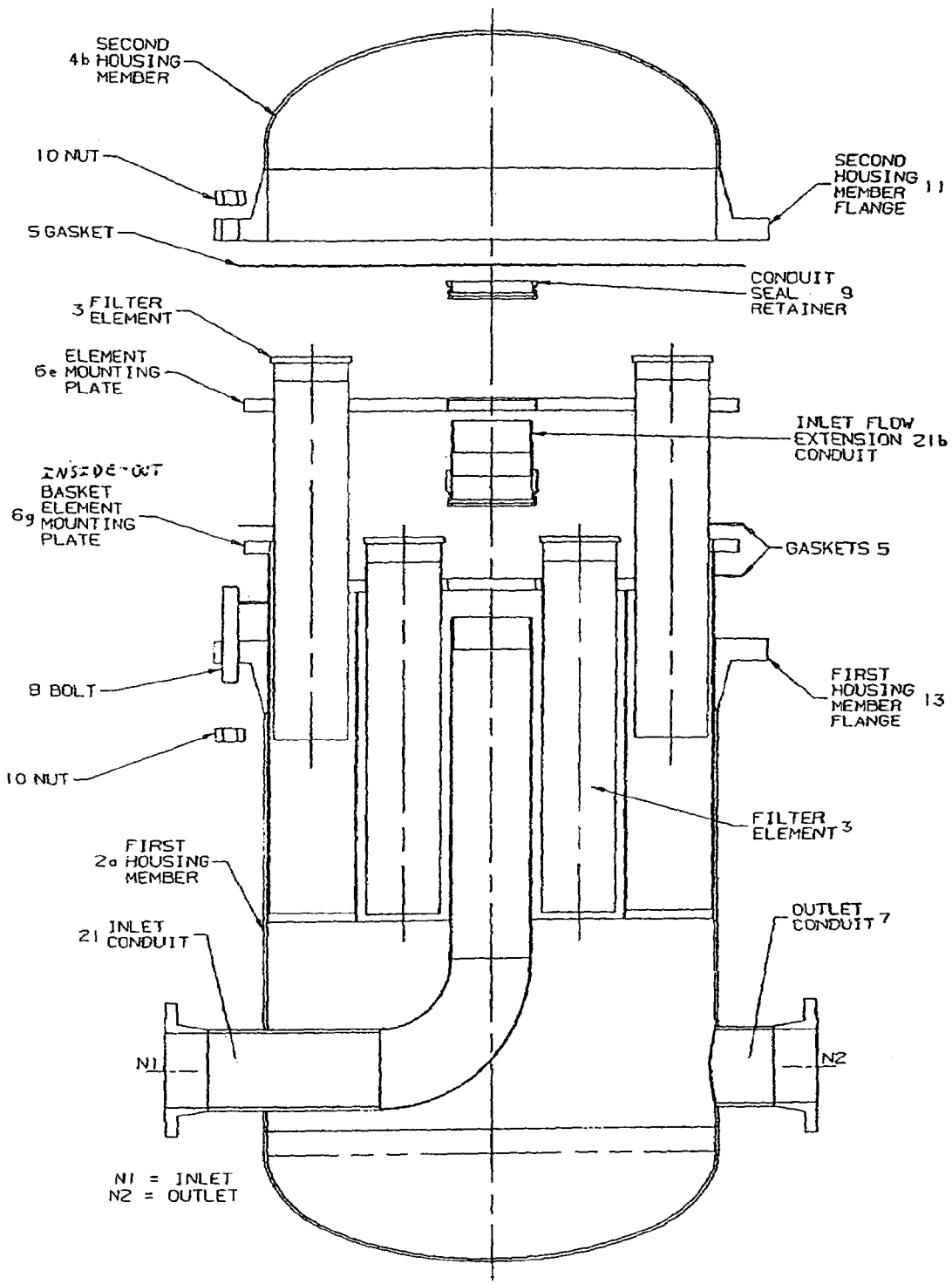
FIG. 7 is a medial cross-sectional view of a widened first housing member containing an inflow and out flow conduit, fitted with both pre-treatment and after-treatment inside-out flow filter elements within the first filter housing member.

The preferred embodiment of FIG. 7 depicts a twice filtered fluid flow, having a first and second fluid filtration utilizing inside-out filter flow elements 3 all within a widened first housing member 2a. When fluid flow is directed through inlet conduit 21 and inlet conduit extension 21b of first housing member 2a, into the interior of widened second housing member 4b, fluid then passes to the interior of inside-out filter flow elements 3 mounted on flat element plate 6e. At this point the pretreated fluid flow reverses direction and enters filter elements 3 mounted on basket shaped element adapter plate 6g (as shown in FIG. 9D), leaving debris as it exits the filters 3 and enters the interior the first housing member 2a. The fluid flow then exits the first filter housing member 2a via outlet conduit 7.

In the preferred embodiment of FIG. 7, housing members 4b and 2a are separated by a widened flat mounting plate 6e (as shown in FIG. 8C) and a widened basket mounting plate 6g (as shown in FIG. 9D) having the appropriate gaskets 5 and conduit seal retainer 9 to seal the interior environments of the housing members 2a and 4b. A set of pretreatment filter elements 3 are attached to the mounting plate 6e within the widened first housing member 2a and a post treatment set of filter elements 3 are attached to basket type mounting plate 6g within the widened first housing member 2a. The housing members 2a and 4b in the preferred embodiment of FIG. 7 are separated by sealed element mounting plates 6e and basket element mounting plate 6g, having gaskets 5 between the housing members 2a and 4b and mounting plates 6e and 6g, as well as between the mounting plates 6e and 6g.

In some fluid treatment services, such as phase separation, the flow direction through the filter housing will be reversed. The inlet conduit 21 will then become the outlet and the outlet conduit 7 the inlet. Additional nozzles in the shell and bonnet to remove separated fluids may also be provided.

The advantages of a filtration system in accordance with the present invention is that the filter elements can be integrated and interchanged by the user to more effectively and efficiently meet the demands of changes in service conditions. The housing members and mounting plates are preferably interchangeable to provide the maximum possibilities for treatment variation in a single system. As described above in the background section, conventional filter housing systems lack the ability to accommodate treatment elements with different flow characteristics from a variety of element manufacturers.

The ability of the element mounting plate to be replaceable, to adapt to various filter elements, along with the unique combination of pre and after filter modifications as described in the preferred embodiments, sets the present invention apart from the prior art. Those skilled in the art will recognize that changes can be made from the form and detail without departing from the spirit and scope of the invention and that all such changes are intended to be covered, limited only by the appended claims.

I claim:

1. A fluid treatment element housing system comprising a first housing member having a fluid inlet and a fluid outlet, a second housing member and a plurality of reversably interchangeable mounting plates, wherein the interchangeable mounting plates comprise at least a first mounting plate comprising one or more apertures each having a mount for releasably mounting a first type fluid treatment element thereon and a second mounting plate comprising one or more apertures each having a mount for releasably mounting a second type fluid treatment element thereon, and further wherein the fluid inlet and fluid outlet remain unchanged regardless of the mounting plate used.

2. The housing system of claim 1, wherein the mounting plates with the fluid treatment elements mounted thereon create a sealed environment between the interiors of the first and second housing members.

3. The housing system of claim 1, wherein said first housing member and said second housing member each comprise a closure flange and said mounting plates each comprise a mounting flange for engagement between the closure flanges of the first and second housing members.

4. The housing system of claim 2, wherein the first mounting plate is substantially flat and wherein the first type fluid treatment elements are inside-out filters extending downwardly into the first housing member.

5. The housing system of claim 2, wherein the second mounting plate is substantially basket shaped and wherein the second type fluid treatment elements are outside-in filters extending upwardly in the first housing member.

6. The housing system of claim 2, wherein said second housing member extends upwardly to house fluid treatment elements therein.

7. The housing system of claim 6, further comprising a conduit extension for directing the fluid inflow from the fluid inlet to the area at the top of said second housing member.

8. The housing system of claim 2, wherein the first mounting plate is associated with fluid treatment elements extending into the first housing member and the second mounting plate is associated with fluid treatment elements extending into the second housing member, for housing filter elements in each of the first and second housing members.

9. The housing system of claim 2, wherein said second housing member does not contain any fluid treatment elements.

10. The housing system of claim 2, wherein two mounting plates are used and the fluid treatment elements on the first mounting plate and on the second mounting plate extend into said first housing member.

11. The housing system of claim 2, further comprising a conduit for directing the inflow from the fluid inlet through the mounting plate to a point above the mounting plate.

12. The housing system of claim 11, wherein a conduit seal retainer maintains a seal between the conduit and the mounting plate.

13. The housing system of claim 2, wherein the first mounting plate and the second mounting plate can be used individually or collectively.

14. The housing system of claim 2, wherein said second housing member comprises a plurality of interchangeable second housing members including at least a second housing member which cannot house fluid treatment elements and an extended second housing member which can house fluid treatment elements.

15. A fluid treatment element housing system comprising a first housing member having a fluid inlet and a fluid outlet, and at least one of a plurality of reversably interchangeable second housing members and a plurality of reversably interchangeable mounting plates, wherein the reversably interchangeable second housing members, when used, comprise a at least a substantially flat second housing member which cannot house fluid treatment elements and a substantially domed second housing member which can house fluid treatment elements and wherein the reversably interchangeable mounting plates, when used, comprise at least a first mounting plate comprising one or more apertures each having a mount for releasably mounting a first type fluid treatment element thereon and a second mounting plate comprising one or more apertures each having a further where mount for releasably mounting a second type fluid treatment element thereon, and the fluid inlet and fluid outlet remain unchanged regardless of the second housing member and mounting plate used.

16. The housing system of claim 15, wherein the mounting plates with the fluid treatment elements mounted thereon create a sealed environment between the interiors of the first and second housing members.

17. The housing system of claim 15, wherein said first housing member and said plurality of second housing members each comprise a closure flange and said mounting plates each comprise a mounting flange for engagement between the closure flanges of the first and second housing members.

18. The housing system of claim 15, further comprising a conduit for directing the inflow from the fluid inlet through the mounting plate to a point above the mounting plate.

19. The housing system of claim 18, wherein a conduit seal retainer maintains a seal between the conduit and the mounting plate.

20. The housing system of claim 15, wherein the first mounting plate and the second mounting plate can be used individually or collectively.

* * * * *